No. 763,181. PATENTED JUNE 21, 1904.
H. HARDWICK.
PILE WIRE FOR LOOMS.
APPLICATION FILED NOV. 17, 1903.
NO MODEL.
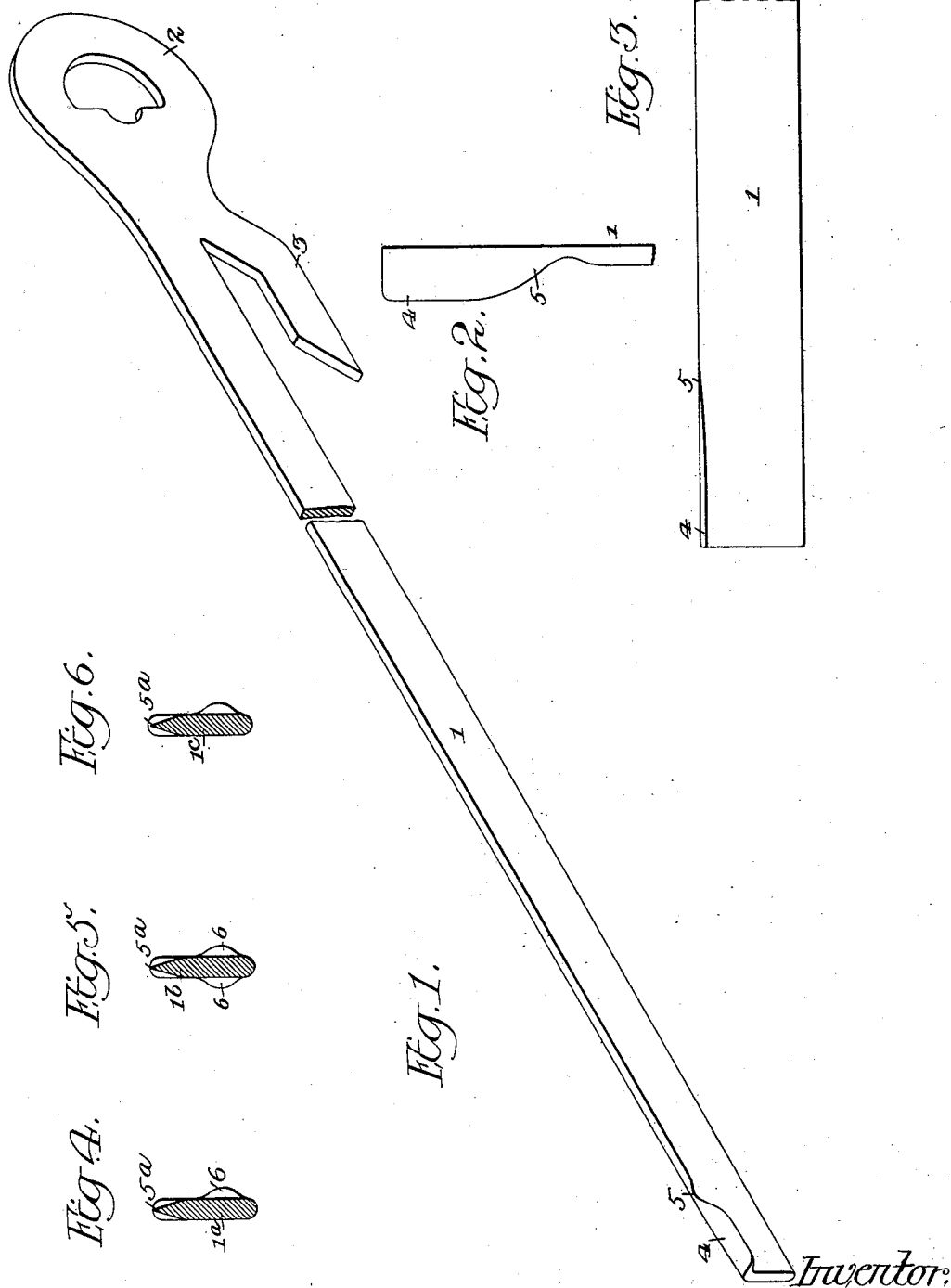

No. 763,181. Patented June 21, 1904.

UNITED STATES PATENT OFFICE.

HARRY HARDWICK, OF PHILADELPHIA, PENNSYLVANIA, ASSIGNOR TO IVINS, DIETZ AND METZGER COMPANY, OF PHILADELPHIA, PENNSYLVANIA, A CORPORATION OF PENNSYLVANIA.

PILE-WIRE FOR LOOMS.

SPECIFICATION forming part of Letters Patent No. 763,181, dated June 21, 1904.

Application filed November 17, 1903. Serial No. 181,528. (No model.)

*To all whom it may concern:*

Be it known that I, HARRY HARDWICK, a citizen of the United States, residing in Philadelphia, Pennsylvania, have invented certain Improvements in Pile-Wires for Looms, of which the following is a specification.

The object of my invention is to construct a pile-wire for looms that will when withdrawn cut a row of loops of pile warp-threads formed upon it without cutting loops formed over a plurality of successive wires. This object I attain in the manner hereinafter set forth, reference being had to the accompanying drawings, in which—

Figure 1 is a perspective view, on an enlarged scale, of a pile-wire constructed in accordance with my invention. Fig. 2 is a plan view, on a still larger scale, of the cutting portion of the wire. Fig. 3 is a side view of the same, and Figs. 4, 5, and 6 are enlarged sectional views of other forms of pile-wire embodying my invention.

A pile-wire constructed in accordance with my invention is similar in all respects to an ordinary pile-wire intended to cut the pile-loops as it is withdrawn from the same—that is to say, it is not strictly a wire, but a bar or blade 1, whose thickness is much less than its height, this bar being provided at one end with a head 2 and hook 3 and at the opposite end with a cutting-blade 4; but the latter, instead of being upon the top of the wire, as usual, is formed by laterally bending the upper edge of the wire so as to form a side cutting edge 5. Hence as the wire is withdrawn through a row of loops previously formed over it the blade 4 will laterally distend the upper portion of said loops and will thus draw them tightly against the cutting edge of the blade, thereby insuring the proper severing of the loops by said cutting edge, whereas a loop which passes over two or more of the wires is not subjected to this distending action, and hence said longer loops are not severed by the withdrawal of the blade, it being understood, of course, that the laterally-projecting knife 4 of each wire projects in a direction toward the inside of said long loops.

Although I prefer to provide the wire with the laterally-bent knife having a side cutting edge, a knife having its cutting edge at the top of the wire may be employed if said wire is also provided with means for laterally distending the loop formed over the wire so as to draw the single loops into contact with the cutting edge of the wire while failing to draw the longer loops formed over two or more wires into such cutting contact. One instance of such a wire is shown at $1^a$ in Fig. 4, on reference to which it will be observed that the cutting edge $5^a$ is at the top of the wire and there is on one side of the wire a rib or projection 6, which will so distend the loop formed on the wire as to tighten the same where it passes over the cutting edge $5^a$, and thus insure the severing of the loop by the knife.

The wire shown at $1^b$ in Fig. 5 is similar to that in Fig. 4, except that it has projecting ribs 6 on each side, and the wire shown at $1^c$ in Fig. 6 is similar to that of Fig. 4, except that the cutting edge $5^a$ is slightly below the top of the wire, so as to still further insure the cutting only of those loops which are formed over the single wires while freeing from any cutting action the loops which are formed over a plurality of wires.

Having thus described my invention, I claim and desire to secure by Letters Patent—

1. A pile-wire for looms having thereon a cutting-knife located at the top of the wire, and means for laterally distending the loop formed over the wire at the time that the knife is acting upon the same, substantially as specified.

2. A pile-wire for looms having a portion at the top of the wire bent to form a laterally-projecting knife, with side cutting edge, substantially as specified.

3. A pile-wire for looms having at the top a cutting-knife with lateral cutting-face, substantially as specified.

In testimony whereof I have signed my name to this specification in the presence of two subscribing witnesses.

HARRY HARDWICK.

Witnesses:
HENRY NOAR,
JOS. H. KLEIN.